(12) United States Patent
Liu

(10) Patent No.: US 9,710,990 B1
(45) Date of Patent: Jul. 18, 2017

(54) CASH MANAGEMENT SYSTEM CAPABLE OF VERIFYING ALL OF BANKNOTES DELIVERED FROM BACKYARD AREA TO VERIFICATION HEADQUARTER AT ONE TIME

(71) Applicant: MASTERWORK AUTOMODULES TECHNOLOGY CORP., LTD., Taipei (TW)

(72) Inventor: Ming-Hsun Liu, Taipei (TW)

(73) Assignee: MASTERWORK AUTOMODULES TECHNOLOGY CORP., LTD., Taipei (TW)

( * ) Notice: Subject to any disclaimer, the term of this patent is extended or adjusted under 35 U.S.C. 154(b) by 3 days.

(21) Appl. No.: 15/227,970

(22) Filed: Aug. 4, 2016

(51) Int. Cl.
  *G07F 19/00* (2006.01)
  *G07D 11/00* (2006.01)
  *H04L 29/08* (2006.01)
  *G06K 7/10* (2006.01)

(52) U.S. Cl.
  CPC ..... *G07D 11/0075* (2013.01); *G06K 7/10366* (2013.01); *G07D 11/0021* (2013.01); *G07D 11/0078* (2013.01); *H04L 67/02* (2013.01)

(58) Field of Classification Search
  CPC ........... G07D 11/0075; G07D 11/0021; G07D 11/0078; G06K 7/10366; G07F 19/20; G07F 7/1008; G06Q 20/1085; G06Q 20/341

USPC .................................................. 235/379, 380
See application file for complete search history.

(56) References Cited

U.S. PATENT DOCUMENTS

| | | | | |
|---|---|---|---|---|
| 2004/0210515 A1* | 10/2004 | Hughes | ..................... | E05G 1/06 705/39 |
| 2007/0112459 A1 | 5/2007 | Bell | | |
| 2015/0242825 A1* | 8/2015 | Mills | .................. | G06Q 20/0655 705/64 |
| 2015/0287133 A1 | 10/2015 | Marlov | | |

FOREIGN PATENT DOCUMENTS

| EP | 2 819 106 A1 | 12/2014 |
|---|---|---|
| WO | 2015114746 A1 | 8/2015 |

* cited by examiner

*Primary Examiner* — Karl D Frech
(74) *Attorney, Agent, or Firm* — Winston Hsu

(57) ABSTRACT

A cash management system includes a cloud server, a banknote cash unit and a verification center. The banknote cash unit senses serial numbers of banknotes introduced therein for obtaining serial number data corresponding to the banknotes. The banknote cash unit further uploads the serial number data to the cloud server, such that the verification center downloads the serial number data. The verification center senses the banknotes sent thereto for obtaining the verification data corresponding to the banknotes sent to the verification center and determines whether the serial number data matches the verification data. Accordingly, the cash management system is able to verify all of banknotes delivered from backyard area to verification headquarter at one time.

12 Claims, 7 Drawing Sheets

CASH MANAGEMENT SYSTEM CAPABLE OF VERIFYING ALL OF BANKNOTES DELIVERED FROM BACKYARD AREA TO VERIFICATION HEADQUARTER AT ONE TIME

BACKGROUND OF THE INVENTION

1. Field of the Invention

The present invention relates to a cash management system, and more particularly, to a cash management system capable of verifying all of banknotes delivered from backyard area to verification headquarter at one time.

2. Description of the Prior Art

Generally, a store such as a supermarket, a shopping mall and so on, is divided into a front area where a store clerk deposits cash actually exchanged with a customer and a backyard area where the cash in the front area are managed. One of a plenty of cash settlement units are placed in the front area, and a banknote cash unit is placed in the backyard area. The cash settlement unit is operated by the store clerk, and settlement processing between the store clerk and the customer is performed with the cash settlement unit.

For example, a payment for a purchase is deposited in the cash settlement unit, and proceeds of banknotes collected from the cash settlement unit are deposited in the banknote cash unit. The banknotes received from the cash settlement unit are given to the banknote cash unit and stored in a storage bag that is detachably installed in the banknote cash unit.

However, since one banknote cash unit in the backyard area is for the plenty of cash settlement units in the front area, i.e., banknotes from the plenty of cash settlement units can be inputted into the same storage bag installed in the one banknote cash unit, it needs plenty of operators in the backyard area to manually separate the banknotes which are introduced into the banknote cash unit one on one by each of the cash settlement units and results in wasting labor hours and inconvenience of operation.

SUMMARY OF THE INVENTION

Thus, the present invention provides a cash management system capable of verifying all of banknotes delivered from backyard area to verification headquarter at one time for solving above drawbacks.

According to an embodiment of the present invention, the cash management system includes a cloud server, a banknote cash unit and a verification center. The banknote cash unit is capable of communicating with the cloud server via a network and includes a first network communication module, a banknote serial number reader and a controller. The first network communication module is for establishing connection with the cloud server. The banknote serial number reader is for sensing each of at least one serial number of at least one banknote introduced into the banknote cash unit, so as to obtain at least one serial number data corresponding to the at least one banknote introduced into the banknote cash unit. The controller is coupled to the first network communication module and the banknote serial number reader. The controller controls the first network communication module to upload the at least one serial number data to the cloud server. The verification center is capable of communicating with the cloud server via the network and includes a second network communication module, a verification unit and a processing center. The second network communication module is for establishing connection with the cloud server. The verification unit is for sensing each of the at least one serial number of the at least one banknote sent to the verification center, so as to obtain at least one verification data corresponding to the at least one banknote sent to the verification center. The processing center is coupled to the second network communication module and the verification unit. The processing center controls the second network communication module to download the at least one serial number data from the cloud server and determines whether the at least one verification data matches the at least one serial number data.

According to another embodiment of the present invention, the banknote cash unit further comprises a first identification tag reader and an input module. The first identification tag reader is coupled to the controller and for sensing an identification tag of a storage bag installed in the banknote cash unit, so as to get an identification data corresponding to the storage bag. The input module is coupled to the controller and for inputting at least one account. The storage bag is for storing the at least one banknote introduced into the banknote cash unit, and the controller further controls the first network communication module to upload the identification data and the at least one account to the cloud server.

According to another embodiment of the present invention, the cloud server comprises a cloud data storage unit and a cloud processing unit. The cloud processing unit is coupled to the cloud data storage unit and stores the identification data, the at least one account and the at least one serial number data in the cloud data storage unit.

According to another embodiment of the present invention, the verification center further comprises a second identification tag reader coupled to the processing center. The second identification tag reader senses the identification tag of the storage bag sent to the verification center, so as to obtain an identification data corresponding to the storage bag, wherein the processing center controls the second network communication module to download the identification data, the at least one account and the at least one serial number data when the identification data sensed by the second identification tag reader matches the identification data sensed by the first identification tag reader.

According to another embodiment of the present invention, the banknote cash unit further comprises a paper sheet storing unit coupled to the controller. The paper sheet storing unit is for holding a storage bag, wherein the storage bag is for storing the at least one banknote introduced into the banknote cash unit.

According to another embodiment of the present invention, the cash management system further comprises a courier service unit for delivering the storage bag from the banknote cash unit to the verification center.

According to another embodiment of the present invention, the cloud server passes a password to the courier service unit and the banknote cash unit, and the banknote cash unit further comprises an input module coupled to the controller and for inputting the password. The paper sheet storing unit sealing the storage bag when the password inputted by the input module matches the password passed to the banknote cash unit.

According to another embodiment of the present invention, the banknote cash unit further comprises a housing, a banknote inlet unit, a paper sheet storing unit and a transportation unit. The banknote inlet unit is disposed on the housing and for introducing at least one banknote. The paper sheet storing unit is installed in the housing and for holding a storage bag. The transportation unit is disposed inside the housing and for transporting the at least one banknote from the banknote inlet unit into the storage bag held by the paper sheet storing unit.

In summary, the present invention is able to verifying all of banknotes delivered from the banknote cash unit disposed backyard area to the verification center disposed in the verification headquarter at one time. It saves labor hours for reconciliation process and enhances convenience of operation. Furthermore, it allows multiple users to deposit their banknotes in the same banknote cash unit which greatly decreases quantity of the banknote cash unit and installation costs for build the entire cash management system.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
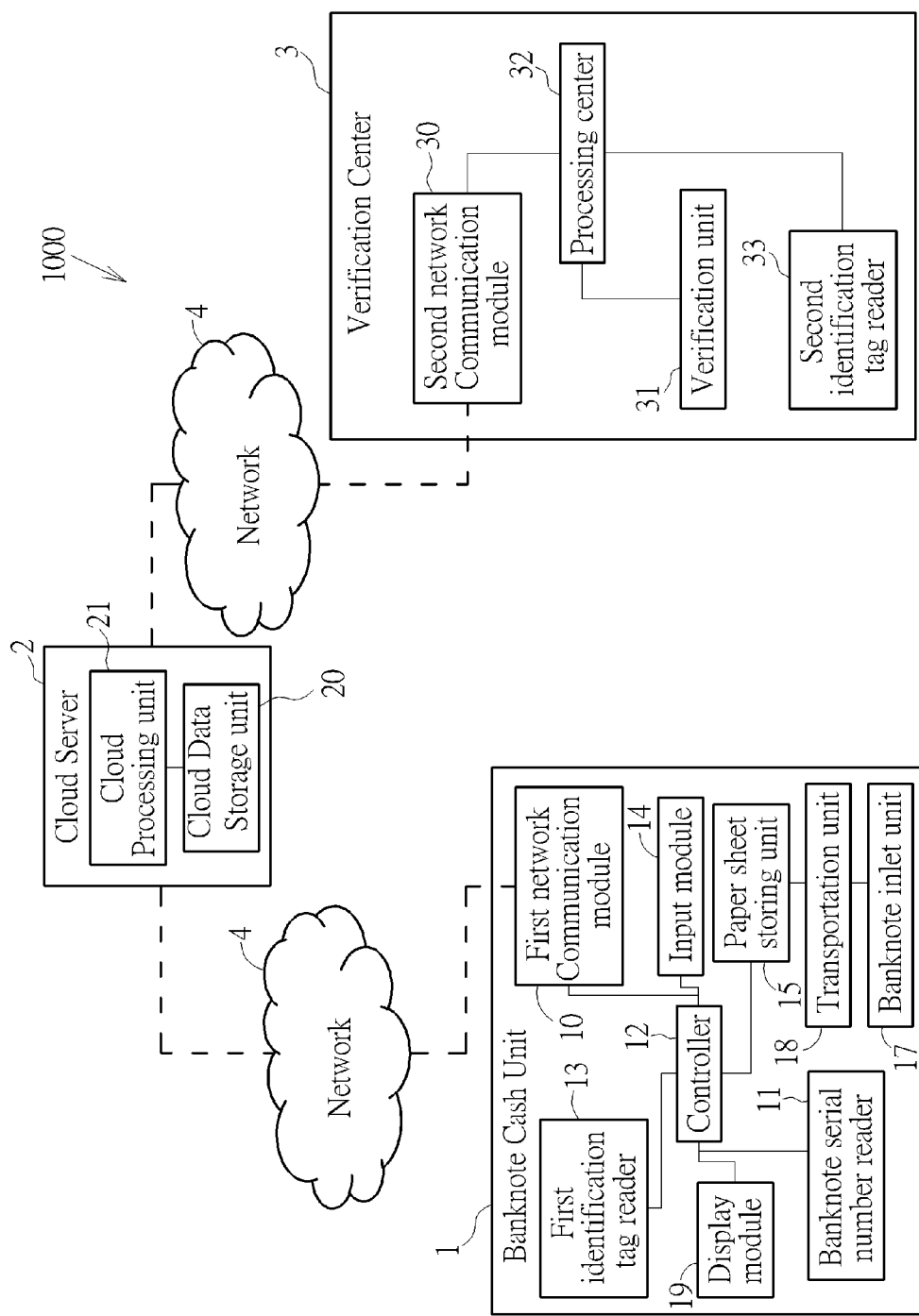
FIG. 1 is a functional block diagram of a cash management system according to an embodiment of the present invention.

Please refer to FIG. 1. FIG. 1 is a functional block diagram of a cash management system 1000 according to an embodiment of the present invention. As shown in FIG. 1, the cash management system 1000 includes a banknote cash unit 1, a cloud server 2 and a verification center 3. In this embodiment, the banknote cash unit 1 is placed in the backyard area where banknotes in the front area at which a store clerk deposits cash actually exchanged with a customer are managed. The verification center 3 is a verification headquarter, such as a bank, a branch and so on. The cloud server 2 can be placed in the verification headquarter, i.e., the verification center 3 or at a place other than the verification headquarter.

Figure 2A:
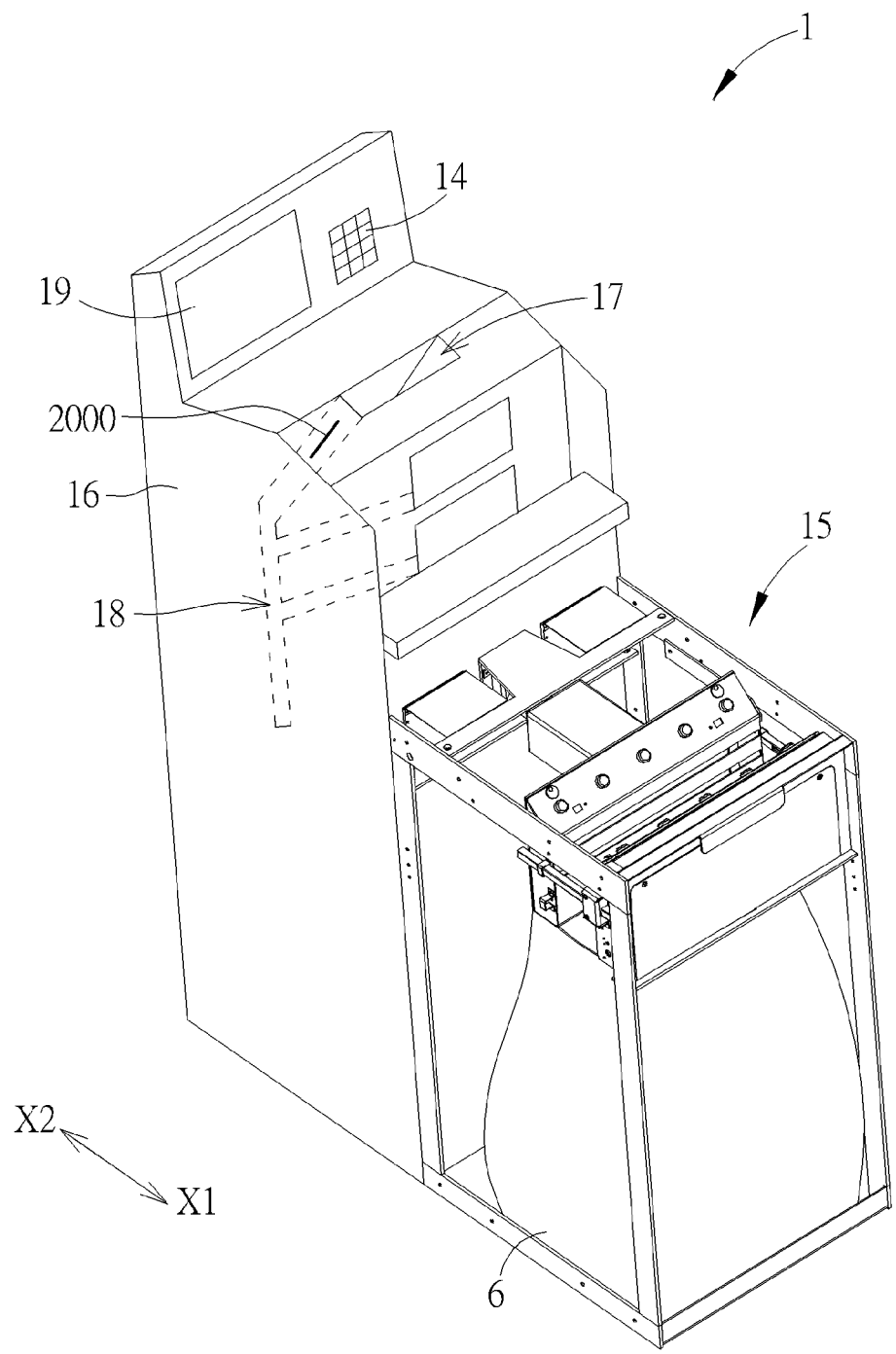
FIG. 2A is a diagram of a banknote cash unit in an opened status according to the embodiment of the present invention.
Figure 2B:
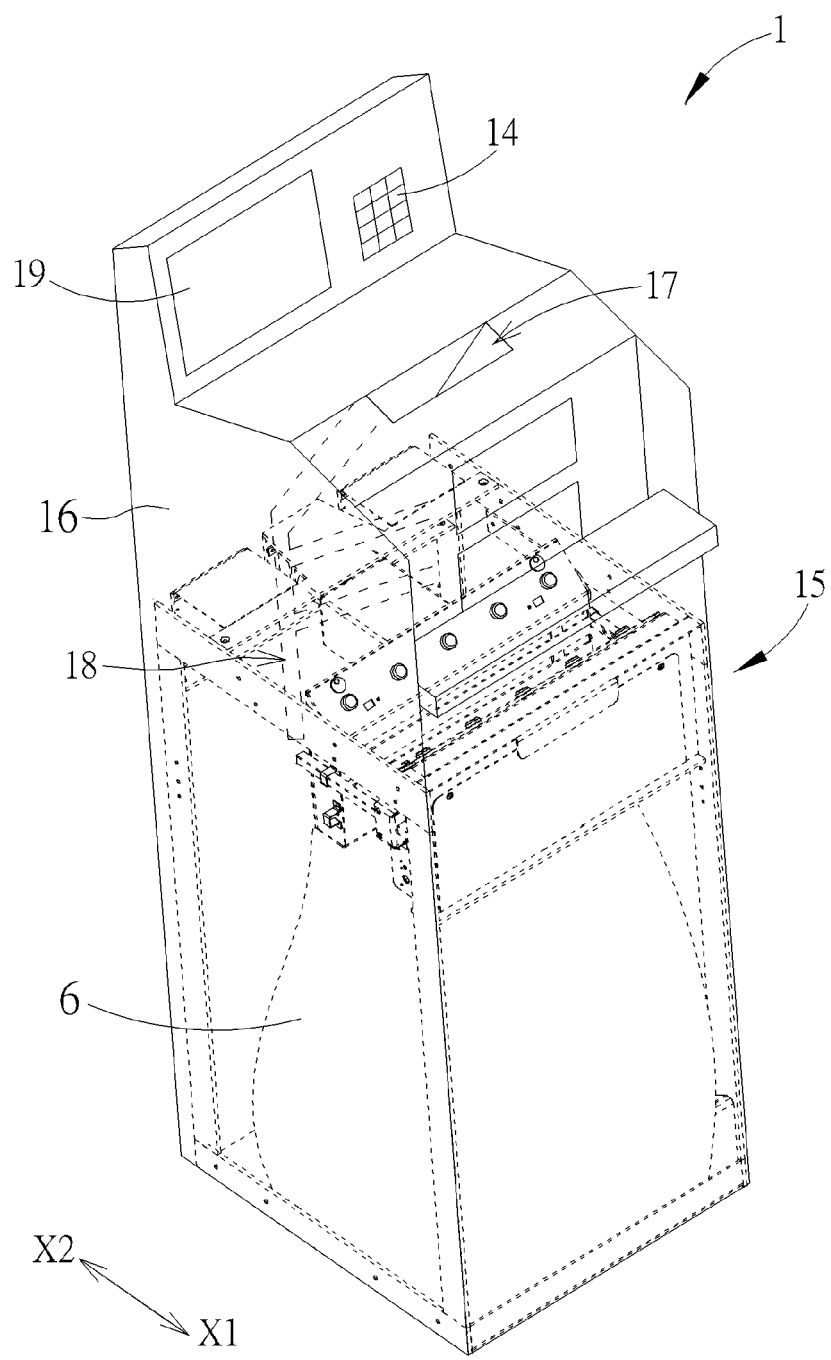
FIG. 2B is a diagram of the banknote cash unit in a closed status according to the embodiment of the present invention.

Please refer to FIG. 1, FIG. 2A and FIG. 2B. FIG. 2A is a diagram of the banknote cash unit 1 in an opened status according to the embodiment of the present invention. FIG. 2B is a diagram of the banknote cash unit 1 in a closed status according to the embodiment of the present invention. As shown in FIG. 1, FIG. 2A and FIG. 2B, the banknote cash unit 1 includes a first network communication module 10, a banknote serial number reader 11, a controller 12, a first identification tag reader 13, an input module 14, a paper sheet storing unit 15, a housing 16, a banknote inlet unit 17 and a transportation unit 18. The cloud server 2 includes a cloud data storage unit 20 and a cloud processing unit 21. The verification center 3 includes a second network communication module 30, a verification unit 31, a processing center 32 and a second identification tag reader 33.

The first network communication module 10 is disposed in the housing 16 and for establishing connection with the cloud server 2, such that the banknote cash unit 1 is capable of communication with the cloud server 2 via a network 4. The second network communication module 30 is for establishing connection with the cloud server 2, such that the verification center is capable of communication with the cloud server 2 via the network 4. The banknote inlet unit 17 is disposed on the housing 16 and for introducing at least one banknote 2000. The paper sheet storing unit 15 is installed inside the housing 16 and for holding a storage bag 6, wherein the storage bag 6 is for storing the at least one banknote 2000 introduced into the banknote cash unit 1. In this embodiment, the paper sheet storing unit 15 is able to slide relative to the housing 16. For example, when the storage bag 6 is full, the paper sheet storing unit 15 is able to be slid relative to the housing 16 to an opened position along a first direction X1, as shown in FIG. 2A. Accordingly, the storage bag 6 is exposed to allow the user to take out. Furthermore, when another new storage bag is reinstalled in the paper sheet storing unit 15, the paper sheet storing unit 15 is able to be slid relative to the housing 16 to a closed position along a second direction X2 opposite to the first direction X1, as shown in FIG. 2B. Accordingly, the storage bag 6 is installed inside the housing 16 for storing the at least one banknote 2000 introduced into the banknote cash unit 1. The transportation unit 18 is disposed inside the housing 16 and for transporting the at least one banknote 2000 from the banknote inlet unit 17 into the storage bag 6 held by the paper sheet storing unit 15.

In this embodiment, the network 4 is an internet, but the present invention is not limited thereto. For example, the network 4 can be the internet when the cloud server 2 is placed at the place other than the verification headquarter, and the network 4 can be a wireless communication, such as a Wi-Fi, a Bluetooth and so on, when the cloud server 2 is placed at the verification headquarter. Furthermore, the banknote cash unit 1 further includes a display module 19 disposed on the housing 16. The display module 19 is for displaying a user interface, so that a user is able to operate the banknote cash unit 1 according to the user interface. In this embodiment, the display module 19 is a Liquid Crystal Display (LCD), but the present invention is not limited thereto. For example, the display module 19 can be a touch control panel.

The banknote serial number reader 11 is disposed near the banknote inlet unit 17. The controller 12 of the banknote cash unit 1 is disposed inside the housing 16 and coupled to the first network communication module 10, the banknote serial number reader 11, the first identification tag reader 13, the input module 14, the paper sheet storing unit 15 and the display module 19. The processing center 32 of the verification center 3 is coupled to the second network communication module 30, the verification unit 31 and the second identification tag reader 33. The cloud processing unit 21 of the cloud server 2 is coupled to the cloud data storage unit 20. The cash management system 1000 further includes a courier service 5 for delivering the storage bag 6 from the banknote cash unit 1 to the verification center 3.

Figure 3A:
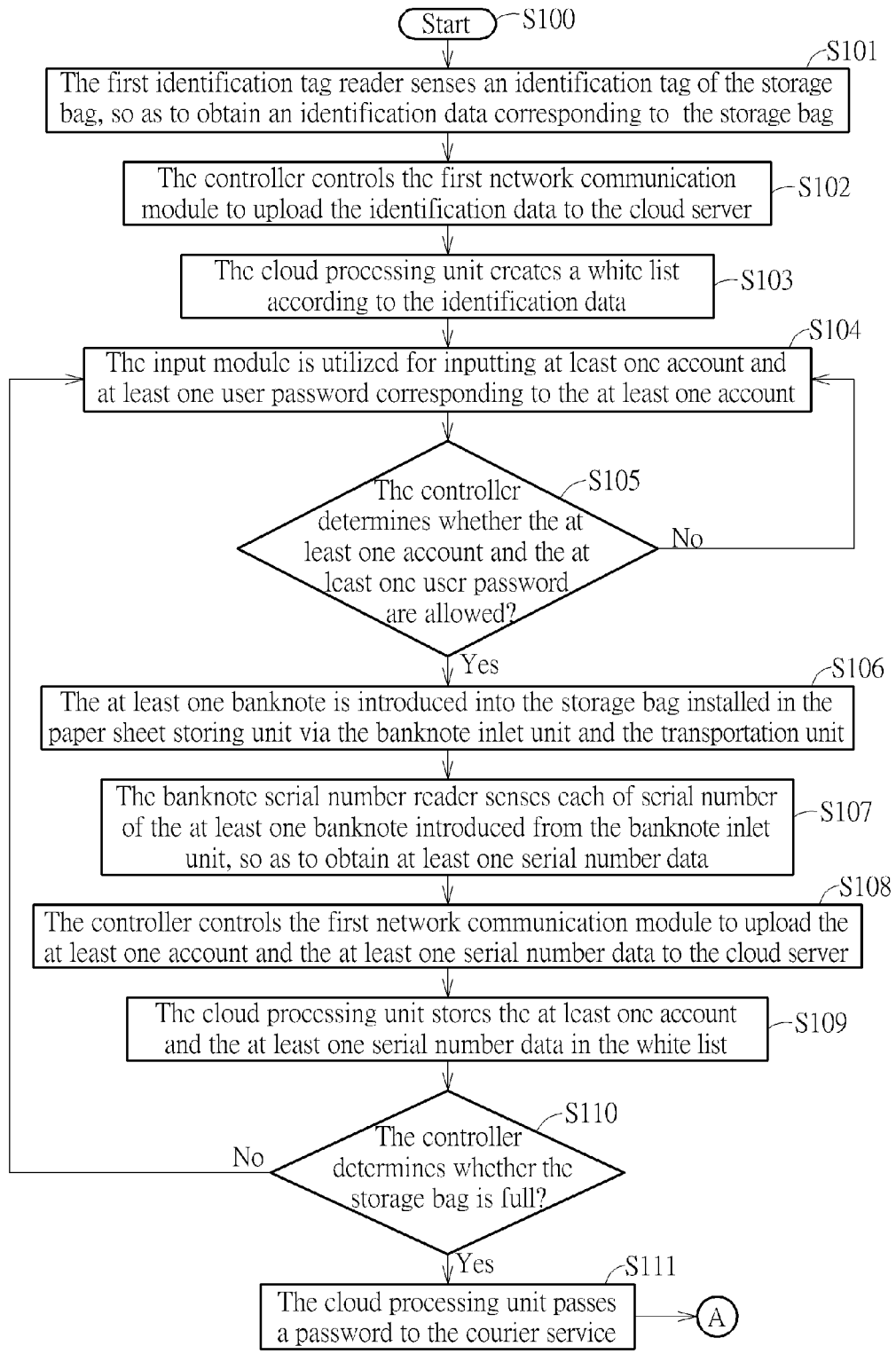
FIGS. 3A, 3B are flow charts illustrating a method for verifying banknotes by utilizing the cash management system according to the embodiment of the present invention.
Figure 3B:
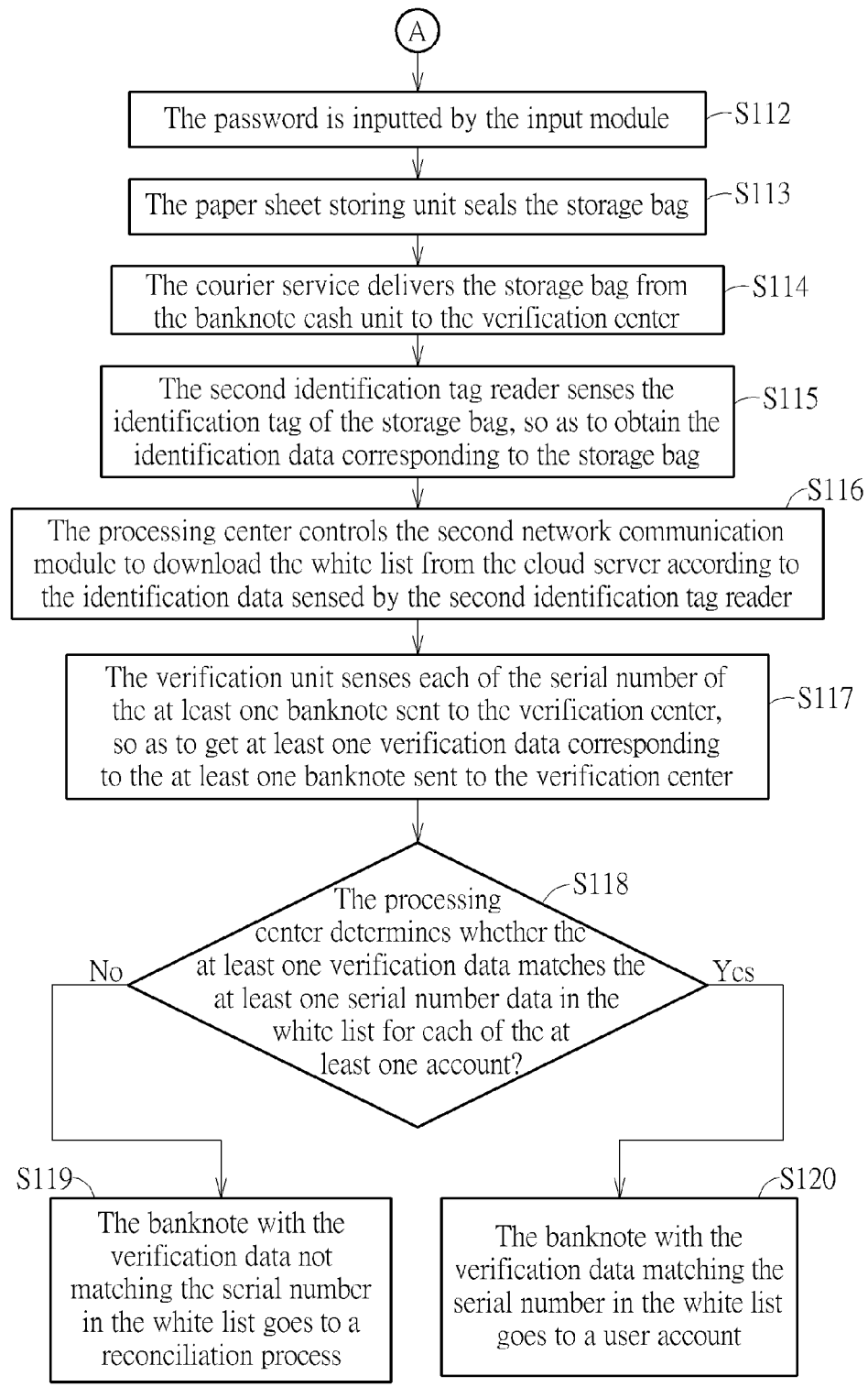

Please refer to FIGS. 3A, 3B. FIGS. 3A, 3B are flow charts illustrating a method for verifying the banknotes 2000 by utilizing the cash management system 1000 according to the embodiment of the present invention. As shown in FIGS. 3A, 3B, the method for verifying the banknotes 2000 by utilizing the cash management system 1000 includes steps of:

S100: Start.

S101: The first identification tag reader 13 senses an identification tag of the storage bag 6, so as to obtain an identification data corresponding to the storage bag 6.

S102: The controller 12 controls the first network communication module 10 to upload the identification data to the cloud server 2.

S103: The cloud processing unit 21 creates a white list according to the identification data.

S104: The input module 14 is utilized for inputting at least one account and at least one user password corresponding to the at least one account.

S105: The controller 12 determines whether the at least one account and the at least one user password are allowed? If yes, go to S106. If no, return to S104.

S106: The at least one banknote 2000 is introduced into the storage bag 6 installed in the paper sheet storing unit 15 via the banknote inlet unit 17 and the transportation unit 18.

S107: The banknote serial number reader 11 senses each of serial number of the at least one banknote 2000 introduced from the banknote inlet unit 17, so as to obtain at least one serial number data.

S108: The controller 12 controls the first network communication module 10 to upload the at least one account and the at least one serial number data to the cloud server 2.

S109: The cloud processing unit 21 stores the at least one account and the at least one serial number data in the white list.

S110: The controller 12 determines whether the storage bag 6 is full? If yes, go to S111. If no, return to S104.

S111: The cloud processing unit 21 passes a password to the courier service 5.

S112: The password is inputted by the input module 14.

S113: The paper sheet storing unit 15 seals the storage bag 6.

S114: The courier service 5 delivers the storage bag 6 from the banknote cash unit 1 to the verification center 3.

S115: The second identification tag reader 33 senses the identification tag of the storage bag 6, so as to obtain the identification data corresponding to the storage bag 6.

S116: The processing center 32 controls the second network communication module 30 to download the white list from the cloud server 2 according to the identification data sensed by the second identification tag reader 33.

S117: The verification unit 31 senses each of the serial number of the at least one banknote 2000 sent to the verification center 3 with the storage bag 6, so as to obtain at least one verification data corresponding to the at least one banknote 2000 sent to the verification center 3.

S118: The processing center 32 determines whether the at least one verification data matches the at least one serial number data in the white list for each of the at least one account? If yes, go to S120. If no, go to S119.

S119: The banknote 2000 with the verification data not matching the serial number in the white list goes to a reconciliation process.

S120: The banknote 2000 with the verification data matching the serial number in the white list goes to a user account.

Figure 4:
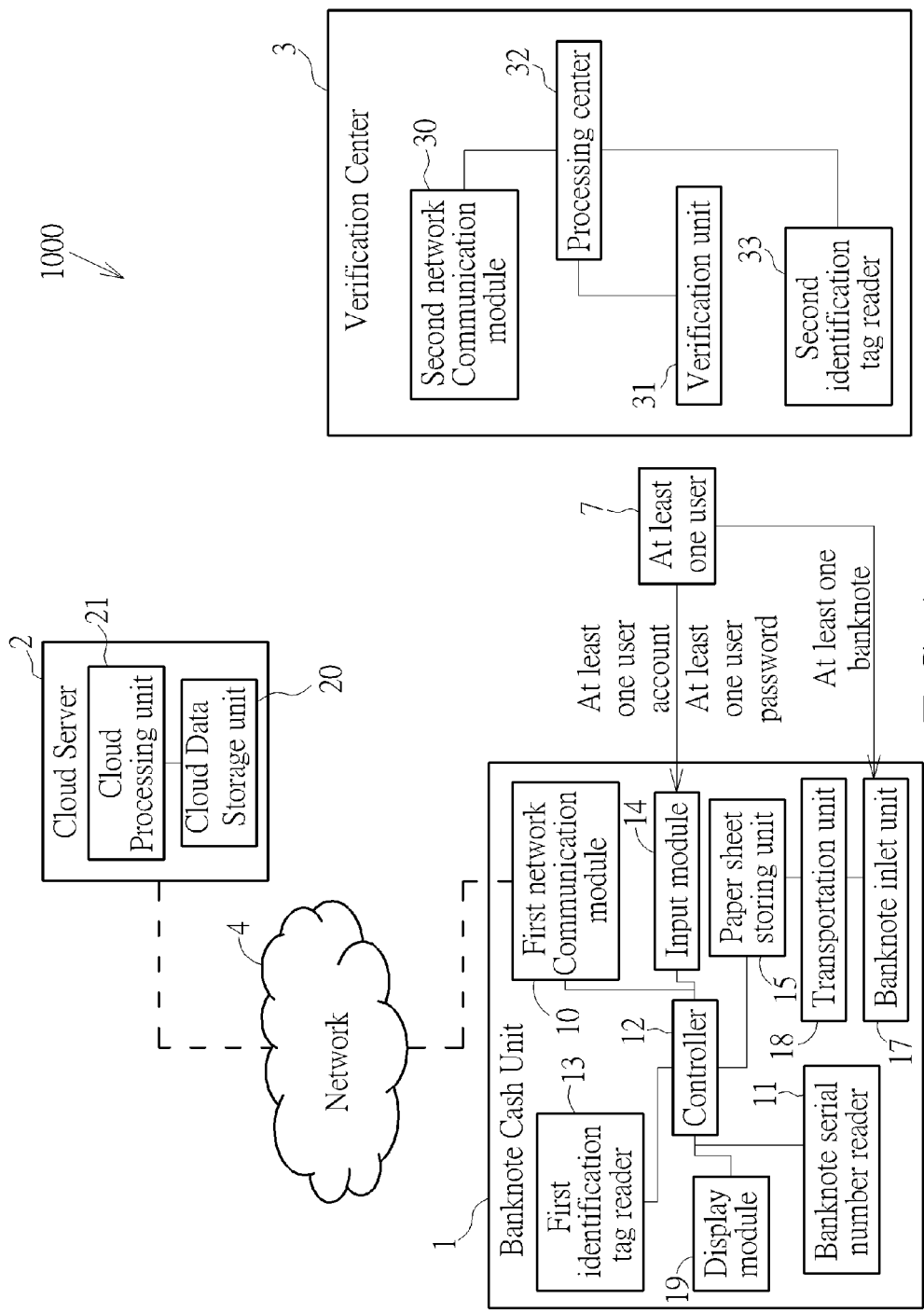
FIG. 4 is a first stage of the cash management system for verifying the banknotes according to the embodiment of the present invention.

Detailed description for the method for verifying the banknotes 2000 by utilizing the cash management system 1000 is provided as follows. Please refer to FIGS. 3A, 3B and FIG. 4. FIG. 4 is a first stage of the cash management system 1000 for verifying the banknotes 2000 according to the embodiment of the present invention. As shown in FIGS. 3A, 3B and FIG. 4, when the storage bag 6 is installed inside the housing 16 of the banknote cash unit 1, the first identification tag reader 13 senses an identification tag of the storage bag 6, so as to obtain an identification data corresponding to the storage bag 6 (S101). Afterwards, the controller 12 controls the first network communication module 10 to upload the identification data to the cloud server 2 (S102), and the cloud processing unit 21 creates a white list according to the identification data (S103).

As mentioned above, the cash management system 1000 of the present invention utilizes the first identification tag reader 13 of the banknote cash unit 1 to obtain the identification data corresponding to the storage bag 6 and further utilizes the first network communication module 10 of the banknote cash unit 1 to upload the identification data to the cloud server 2, such that the cloud processing unit 21 of the cloud server 2 is able to create the white list according to the identification data, wherein the white list can be stored in the cloud data storage unit 20 of the cloud server 2. In this embodiment, the identification tag of the storage bag 6 is a barcode, and the first identification tag reader 13 is a barcode reader correspondingly, but the present invention is not limited thereto. For example, the identification tag of the storage bag 6 can be a Radio Frequency Identification (RFID) tag, and the first identification tag reader 13 can be a RFID reader correspondingly, and it depends on practical demands.

After the installation of the storage bag 6, the upload of the identification data and the creating of the white list are completed, a user 7 is able to operate the banknote cash unit 1 to deposit their banknotes 2000. For example, the user 7 can utilize the input module 14 for inputting an account and a user password corresponding to the account (S104). In S105, after the account and the user password are inputted, the controller 12 determines whether the account and the user password are allowed? If the account and the user password are not allowed, e.g., the account does not match the user password, the display module 19 shows error message to the user 7 and the cash management system 1000 returns back to S104. If the account and the user password are allowed, e.g., the account matches the user password, the cash management system 1000 goes to the next step, i.e., S106.

When the user 7 inputs the account with the right user password, the user 7 is allowed to deposit their banknotes 2000, and the at least one banknote 2000 is introduced into the storage bag 6 installed in the paper sheet storing unit 15 via the banknote inlet unit 17 and the transportation unit 18 (S106). When the at least one banknote 2000 is introduced via the banknote inlet unit 17, the banknote serial number reader 11 senses each of serial number of the at least one banknote 2000 introduced from the banknote inlet unit 17, so as to obtain at least one serial number data (S107), and the controller 12 controls the first network communication module 10 to upload the at least one account and the at least one serial number data to the cloud server 2 (S108).

As mentioned above, the cash management system 1000 of the present invention utilizes the input module 14 for inputting the user's account. Furthermore, the cash management system 1000 of the present invention utilizes banknote serial number reader 11 of the banknote cash unit 1 to obtain the at least one serial number data and further utilizes the first network communication module 10 of the banknote cash unit 1 to upload the user's account and the at least one serial number data to the cloud server 2, such that the cloud processing unit 21 of the cloud server 2 is able to store the account and the serial number data in the white list (S109).

It should be noticed that the cash management system 1000 of the present invention allows more than one user 7 to operate, i.e., the cash management system 1000 of the present invention allows multiple users 7 to input their own accounts. According to each of user's input of their accounts and passwords, the cash management system 1000 is able to utilize the banknote serial number reader 11 of the banknote cash unit 1 to sense the serial numbers of the banknotes 2000 with respect to the user's account inputted at that time and stores the serial number data corresponding to the banknotes 2000 introduced at that time in the white list with the corresponding user's account. As a result, the cash management system 1000 of the present invention allows multiple users 7 to deposit their banknotes with multiple times.

After the cloud processing unit 21 of the cloud server 2 stores the account and the serial number data in the white list, the controller 12 determines whether the storage bag 6 is full (S110)? In this embodiment, the banknote cash unit 1 utilizes a sensor (not shown in figures) to account a number of the banknotes 2000 that are introduced in the storage bag 6. When the number is over a specific number, the controller 12 determines that the storage bag 6 is full, and the cloud processing unit 21 passes a password to the courier service 5 and the banknote cash unit 1, respectively (S111). When the number is not over the specific number, the banknote cash unit 1 returns back to S104 and is still able to accept the deposit of the users 7.

Figure 5:
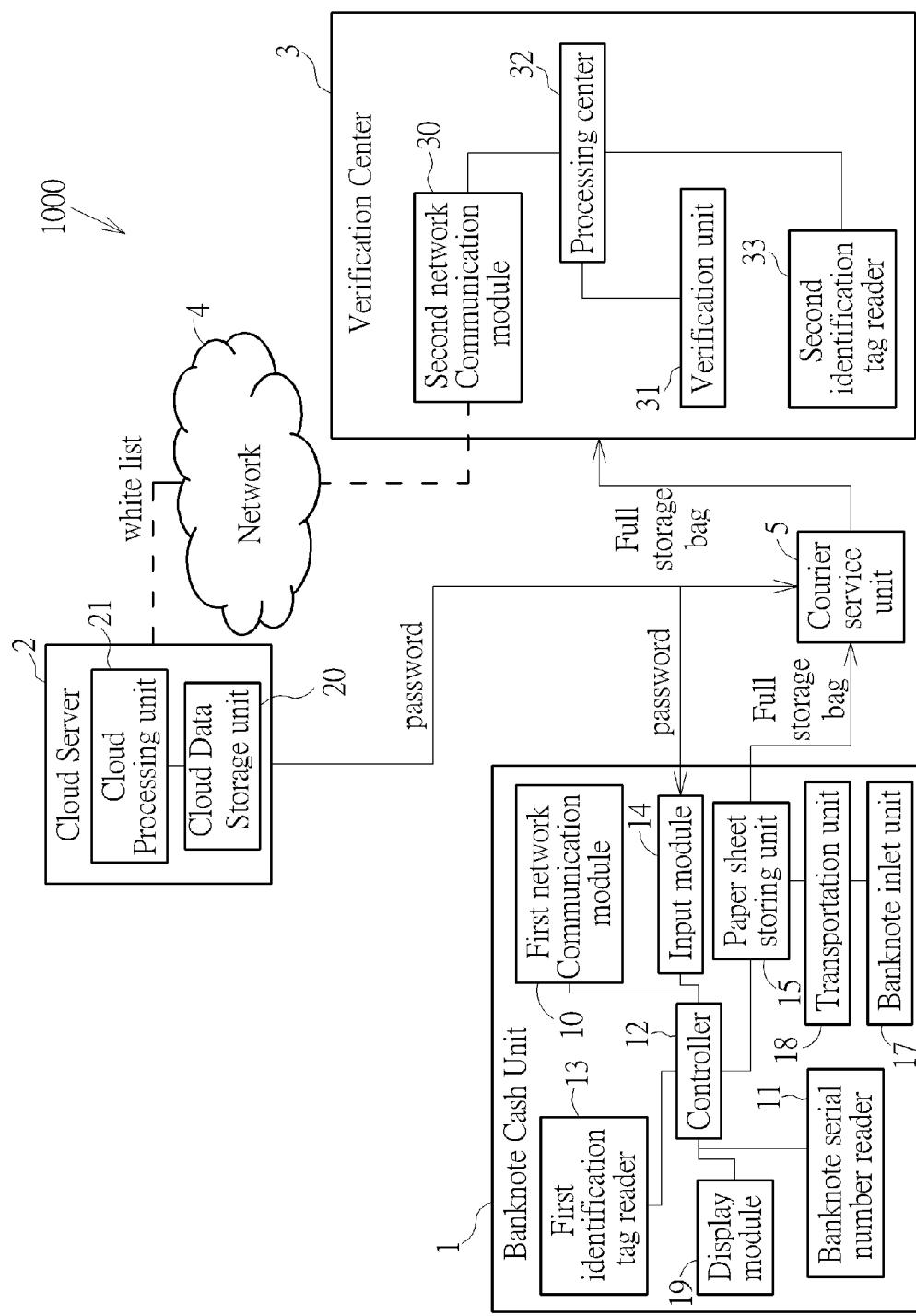
FIG. 5 is a second stage of the cash management system for verifying the banknotes according to the embodiment of the present invention.

Please refer to FIGS. 3A, 3B and FIG. 5. FIG. 5 is a second stage of the cash management system 1000 for verifying the banknotes 2000 according to the embodiment of the present invention. As shown in FIGS. 3A, 3B and FIG. 5, once the courier service 5 gets the password, the banknote cash unit 1 gets the same password as well. Afterwards, a staff of the courier service 5 utilizes the input module 14 to input the password which is given by the cloud processing unit 21 (S112), and the controller 12 of the banknote cash unit 1 determines whether the password which is given by the cloud processing unit 21 and obtained by the banknote cash unit 1 matches the password inputted by the staff. If the password which is given by the cloud processing unit 21 and obtained by the banknote cash unit 1 matches the password inputted by the staff, the paper sheet storing unit 15 seals the storage bag 6 (S113), and the paper sheet storing unit 15 is able to be opened, so that the staff of the courier service 5 is able to deliver the storage bag 6 from the banknote cash unit 1 to the verification center 3 (S114).

When the storage bag 6 is delivered to the verification center 3, the second identification tag reader 33 senses the identification tag of the storage bag 6, so as to obtain the identification data corresponding to the storage bag 6 (S115). Afterwards, the processing center 32 controls the second network communication module 30 to download the white list from the cloud server 2 according to the identification data sensed by the second identification tag reader 33 (S116). In other words, the verification center 3 of the cash management system 1000 is able to download the white list which corresponds to the identification data sensed by the first identification tag reader 13 of the banknote cash unit 1 and includes the account and the serial number data according to the identification data sensed by the second identification tag reader 33 of the verification center 3.

After the white list is downloaded from the cloud server 2 to the verification center 3, the verification unit 31 senses each of the serial number of the at least one banknote 2000 sent to the verification center 3 with the storage bag 6, so as to obtain at least one verification data corresponding to the at least one banknote 2000 sent to the verification center 3 (S117). Afterwards, the processing center 32 determines whether the at least one verification data matches the at least one serial number data in the white list for each of the at least one account (S118)? If the verification data does not match the serial number data in the white list, the banknote 2000 with the verification data not matching the serial number in the white list goes to a reconciliation process (S119), i.e., the banknote 2000 with the verification data not matching the serial number in the white list will be sent to re-check according to the corresponding user's account. If the verification data matches the serial number data in the white list, the banknote 2000 with the verification data matching the serial number in the white list goes to the user account (S120), i.e., the banknote 2000 with the verification data matching the serial number in the white list will be sent to the account in the bank corresponding to the user's account.

Compared to the prior art, the present invention is able to verifying all of banknotes delivered from the banknote cash unit disposed backyard area to the verification center disposed in the verification headquarter at one time. It saves labor hours for reconciliation process and enhances convenience of operation. Furthermore, it allows multiple users to deposit their banknotes in the same banknote cash unit which greatly decreases quantity of the banknote cash unit and installation costs for build the entire cash management system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cash management system capable of verifying all of banknotes delivered from backyard area to verification headquarter at one time, comprising:
   a cloud server;
   a banknote cash unit capable of communicating with the cloud server via a network, comprising:
      a first network communication module for establishing connection with the cloud server;
      a banknote serial number reader for sensing each of at least one serial number of at least one banknote introduced into the banknote cash unit, so as to obtain at least one serial number data corresponding to the at least one banknote introduced into the banknote cash unit; and a controller coupled to the first network communication module and the banknote serial number reader, the controller controlling the first network communication module to upload the at least one serial number data to the cloud server; and a verification center capable of communicating with the cloud server via the network, comprising:

a second network communication module for establishing connection with the cloud server;

a verification unit for sensing each of the at least one serial number of the at least one banknote sent to the verification center, so as to obtain at least one verification data corresponding to the at least one banknote sent to the verification center; and a processing center coupled to the second network communication module and the verification unit, the processing center controlling the second network communication module to download the at least one serial number data from the cloud server and determining whether the at least one verification data matches the at least one serial number data.

2. The cash management system of claim 1, wherein the banknote cash unit further comprises:

a first identification tag reader coupled to the controller and for sensing an identification tag of a storage bag installed in the banknote cash unit, so as to get an identification data corresponding to the storage bag; and an input module coupled to the controller and for inputting at least one account;

wherein the storage bag is for storing the at least one banknote introduced into the banknote cash unit, and the controller further controls the first network communication module to upload the identification data and the at least one account to the cloud server.

3. The cash management system of claim 2, wherein the cloud server comprises:

a cloud data storage unit; and a cloud processing unit coupled to the cloud data storage unit and storing the identification data, the at least one account and the at least one serial number data in the cloud data storage unit.

4. The cash management system of claim 1, wherein the banknote cash unit further comprises:

a paper sheet storing unit coupled to the controller, the paper sheet storing unit being for holding a storage bag, wherein the storage bag is for storing the at least one banknote introduced into the banknote cash unit.

5. The cash management system of claim 4, further comprising:

a courier service unit for delivering the storage bag from the banknote cash unit to the verification center.

6. The cash management system of claim 5, wherein the cloud server passes a password to the courier service unit and the banknote cash unit, and the banknote cash unit further comprises:

an input module coupled to the controller and for inputting the password, the paper sheet storing unit sealing the storage bag when the password inputted by the input module matches the password passed to the banknote cash unit.

7. The cash management system of claim 1, wherein the banknote cash unit further comprises:

a housing;

a banknote inlet unit disposed on the housing and for introducing at least one banknote;

a paper sheet storing unit installed in the housing and for holding a storage bag; and a transportation unit disposed inside the housing and for transporting the at least one banknote from the banknote inlet unit into the storage bag held by the paper sheet storing unit.

8. A cash management system capable of verifying all of banknotes delivered from backyard area to verification headquarter at one time, comprising:

a cloud server, comprising:

a cloud data storage unit; and a cloud processing unit coupled to the cloud data storage unit;

a banknote cash unit capable of communicating with the cloud server via a network, comprising:

a first network communication module for establishing connection with the cloud server;

a banknote serial number reader for sensing each of at least one serial number of at least one banknote introduced into the banknote cash unit, so as to obtain at least one serial number data corresponding to the at least one banknote introduced into the banknote cash unit;

a controller coupled to the first network communication module and the banknote serial number reader, the controller controlling the first network communication module to upload the at least one serial number data to the cloud server;

a first identification tag reader coupled to the controller and for sensing an identification tag of a storage bag installed in the banknote cash unit, so as to get an identification data corresponding to the storage bag; and an input module coupled to the controller and for inputting at least one account; and wherein the storage bag is for storing the at least one banknote introduced into the banknote cash unit, and the controller further controls the first network communication module to upload the identification data and the at least one account to the cloud server, the cloud processing unit stores the identification data, the at least one account and the at least one serial number data in the cloud data storage unit;

a verification center capable of communicating with the cloud server via the network, comprising:

a second network communication module for establishing connection with the cloud server;

a verification unit for sensing each of the at least one serial number of the at least one banknote sent to the verification center, so as to obtain at least one verification data corresponding to the at least one banknote sent to the verification center;

a processing center coupled to the second network communication module and the verification unit, the processing center controlling the second network communication module to download the at least one serial number data from the cloud server and determining whether the at least one verification data matches the at least one serial number data; and a second identification tag reader coupled to the processing center, the second identification tag reader sensing the identification tag of the storage bag sent to the verification center, so as to obtain an identification data corresponding to the storage bag, wherein the processing center controls the second network communication module to download the identification data, the at least one account and the at least one serial number data when the identification data sensed by the second identification tag reader matches the identification data sensed by the first identification tag reader.

9. The cash management system of claim 8, wherein the banknote cash unit further comprises:
a paper sheet storing unit coupled to the controller, the paper sheet storing unit being for holding a storage bag, wherein the storage bag is for storing the at least one banknote introduced into the banknote cash unit.

10. The cash management system of claim 9, further comprising:
a courier service unit for delivering the storage bag from the banknote cash unit to the verification center.

11. The cash management system of claim 10, wherein the cloud server passes a password to the courier service unit and the banknote cash unit, and the paper sheet storing unit sealing the storage bag when the password inputted by the input module matches the password passed to the banknote cash unit.

12. The cash management system of claim 8, wherein the banknote cash unit further comprises:
a housing;
a banknote inlet unit disposed on the housing and for introducing at least one banknote;
a paper sheet storing unit installed in the housing and for holding a storage bag; and
a transportation unit disposed inside the housing and for transporting the at least one banknote from the banknote inlet unit into the storage bag held by the paper sheet storing unit.

* * * * *